US007345616B2

(12) United States Patent
Williams

(10) Patent No.: US 7,345,616 B2
(45) Date of Patent: Mar. 18, 2008

(54) METHOD AND APPARATUS FOR REDUCING THE INFRARED AND RADAR SIGNATURE OF A VEHICLE

(75) Inventor: Randy B. Williams, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 11/628,824

(22) PCT Filed: Apr. 21, 2005

(86) PCT No.: PCT/US2005/013675

§ 371 (c)(1),
(2), (4) Date: Dec. 7, 2006

(87) PCT Pub. No.: WO2006/115477

PCT Pub. Date: Nov. 2, 2006

(65) Prior Publication Data

US 2007/0268173 A1 Nov. 22, 2007

(51) Int. Cl.
*H01Q 17/00* (2006.01)
*F41H 3/00* (2006.01)
*G01S 13/00* (2006.01)

(52) U.S. Cl. .................... 342/4; 342/1; 342/3; 342/13; 428/919; 250/505.1

(58) Field of Classification Search ............. 342/1–13, 342/14, 16; 89/1.11; 250/505.1–519.1; 428/919; 135/88.01, 88.05–88.18
See application file for complete search history.

(56) References Cited

U.S. PATENT DOCUMENTS

| | | | | |
|---|---|---|---|---|
| 2,747,180 | A * | 5/1956 | Brucker | 342/5 |
| 2,985,880 | A * | 5/1961 | McMillan | 342/4 |
| 3,308,462 | A * | 3/1967 | Gluck | 342/1 |
| 3,349,396 | A * | 10/1967 | Reed | 342/3 |
| 3,453,620 | A * | 7/1969 | Reed et al. | 342/4 |
| 3,596,270 | A * | 7/1971 | Fukui | 342/1 |
| 4,162,496 | A * | 7/1979 | Downen et al. | 342/4 |
| 4,327,364 | A * | 4/1982 | Moore | 342/1 |
| 5,385,623 | A * | 1/1995 | Diaz | 342/4 |
| 5,446,459 | A * | 8/1995 | Kim et al. | 342/1 |
| 6,165,601 | A * | 12/2000 | Noda et al. | 342/1 |
| 6,756,931 | B2 * | 6/2004 | Mukasa et al. | 342/1 |

* cited by examiner

*Primary Examiner*—Bernarr E. Gregory
(74) *Attorney, Agent, or Firm*—James E. Walton

(57) ABSTRACT

A radar-absorbing panel (9) includes a honeycomb core (11) and a lower skin (13), where the lower skin (13) is attached to the bottom of the honeycomb core (11). The honeycomb core (11) is made up of individual cells (15), which may be filled with aerogel. The individual cells (15) are approximately ½ of an inch in size with polygonal shape.

21 Claims, 5 Drawing Sheets

METHOD AND APPARATUS FOR REDUCING THE INFRARED AND RADAR SIGNATURE OF A VEHICLE

The U.S. Government has a paid-up license in this invention and the right in limited circumstances to require the patent owner to license others on reasonable terms as provided for by the terms of Contract No. DAAH10-03-2-0005; Work Order 4 YHS.

TECHNICAL FIELD

The present invention relates generally to methods of reducing the infrared and radar signature of a vehicle, specifically to the use of insulative and absorptive materials to reduce the amount of infrared radiation being emitted, and the radar signals being reflected, from certain portions of the vehicle.

DESCRIPTION OF THE PRIOR ART

Vehicles involved in military operations have a need to reduce their visibility to opposing forces. This need exists for all methods modem military forces use to detect and target enemies. Examples of such methods include visual detection, audio detection, active and passive radar, and infrared detection. This need to avoid detection is especially critical for aircraft, such as airplanes and helicopters, which have a high likelihood of being targeted by enemy air and ground forces using any and all of the above detection methods.

To the end of reducing the infrared signature of aircraft, a number of methods have been developed. These include the use of special exhaust ducting and shrouding to reduce the exhaust heat signature, and the addition of infrared insulative and absorptive materials on the outer surface of the aircraft. Although these methods can be very effective when properly employed, each of these methods has drawbacks. In most cases, the addition of infrared-insulative and infrared-absorptive materials to the outer skin of the aircraft represents a significant addition of weight to the aircraft and may interfere with the aerodynamics of the aircraft, reducing the performance and the range of the aircraft.

With respect to the goal of reducing the radar signature of an aircraft, both the shapes of the surfaces of the aircraft and the materials on the surfaces of the aircraft can be optimized to reduce the radar signature. Unfortunately, additional radar-absorptive materials carry with them additional weight, and shapes optimized for minimal radar signature generally exhibit less-than ideal aerodynamic characteristics.

FIG. 1 is a perspective view of a radar-absorbing panel having a honeycomb structure and a lower skin assembly in which the individual cells of the honeycomb structure are fully filled with an aerogel in accordance with the invention disclosed by an application filed by Riley et al., International Publication Number WO 2003/100364 A3 published on Dec. 4, 2003. The Riley application discloses a means of providing a lightweight panel 1 to reduce infrared and radar signatures while adding little or no weight to a vehicle. Riley et al. teach the use of a unique combination of thermal insulators and radar-absorptive honeycomb 3 in the composite skin of an aircraft. Riley et al. teach the benefits of introducing an aerogel 5 into the individual cells 7 of honeycomb 3, which are normally filled with air. In certain instances, aerogel 5 takes the place of solid fillers. Specifically, Riley et al. use aerogel 5 filled honeycomb 3 with a military helicopter.

By using aerogel 5 in combination with radar-absorptive honeycomb 3 in the manner as taught by Riley et al., substantial improvements in the reduction of an aircraft's radar and thermal signatures can be realized with a negligible difference in the weight of the aircraft. Riley et al. further teach that, if employed properly in a composite sandwich arrangement, honeycomb 3 can provide significant structural integrity to the outer surfaces of the aircraft. As such, honeycomb 3 is not "dead weight."

Although aerogels 5 are generally not employed for structural purposes, they have the distinct advantage of being extremely light in weight for a given volume. Furthermore, aerogels 5 are extremely good insulators, so that a relatively small volume, and therefore mass, of aerogels 5 can provide a substantial improvement in thermal performance. Riley et al. teach that the infrared signature and the radar signature of a vehicle can both be reduced simultaneously, without causing adverse effects in either of these areas of concern.

While there have been significant advancements in the field of reducing radar and thermal signatures, vast room for improvement remains.

SUMMARY OF THE INVENTION

The present invention allows for substantial improvements over prior systems. An example of the type of vehicle able to make use of the present invention is a military helicopter, but there is nothing within the spirit and scope of the present invention limiting it to any particular vehicle. For example, the present invention may be implemented in conjunction with any rotorcraft, aircraft, unmanned aerial vehicle, or ground vehicle. The teachings of the present invention are useful with any military or non-military vehicle for which a reduction in radar and/or infrared signature is desired.

The present invention represents the discovery that honeycomb structures having individual cell sizes ranging from about 3/8 of an inch to 1 inch and even larger than 1 inch may be successfully implemented for the use of reducing the radar/microwave and thermal/infrared signature of a vehicle. As referred to throughout this application, "large" cells are cells of a honeycomb core or other core structure containing less than 2.7 cells per linear inch in the core "w" direction (transverse or width direction). Prior to the discovery of the present invention, honeycomb structures used for reducing the radar signature of an aircraft were typically restricted to having individual cells sizes ranging from 1/8 of an inch to 3/16 of an inch, and in rare circumstances, 1/4 of an inch. The present invention dispels several common misconceptions regarding the use of cell sizes larger than 3/16 of an inch, including the holdings that: incorporation of large cell sizes within the honeycomb structure significantly reduces the structural integrity of the honeycomb structure to an untenable level, incorporation of large cell sizes necessitates the use of structural filler material disposed within the individual cells to maintain the structural integrity of the honeycomb structure, incorporation of large cell sizes significantly reduces the radar attenuation properties of the honeycomb structure, and that incorporation of large cell sizes necessitates the use of additional radar attenuation means in conjunction with the large cell sizes. A major advantage of incorporating large cell sizes is that incorporating large cells typically results in a lighter honeycomb structure for equivalent cell material density. Since the structure is lighter, the amount of weight added to the vehicle which may be attributed to the addition of the honeycomb structure is minimized. A further advantage of large cell sizes is the cost of the core is generally reduced as the cell size increases.

The present invention further represents the discoveries that: a pre-impregnated material may be used to form the core of a radar absorptive panel; a radar absorptive panel may comprise multiple layers of cores; a radar absorptive panel may comprise electrically resistive sheets, fabrics, or mat plies located at above, below, or between cores; opacification coatings may be applied to aerogels for selectively layering the aerogels to create an electrical gradient; film adhesives may be reticulated to reduce overall weight of a panel; low emissivity coatings or plies may be incorporated within or on the panel; and that radar attenuating materials may be integrated into film adhesives.

DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DESCRIPTION OF THE PREFERRED EMBODIMENT

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the invention.

Figures 1, 2:
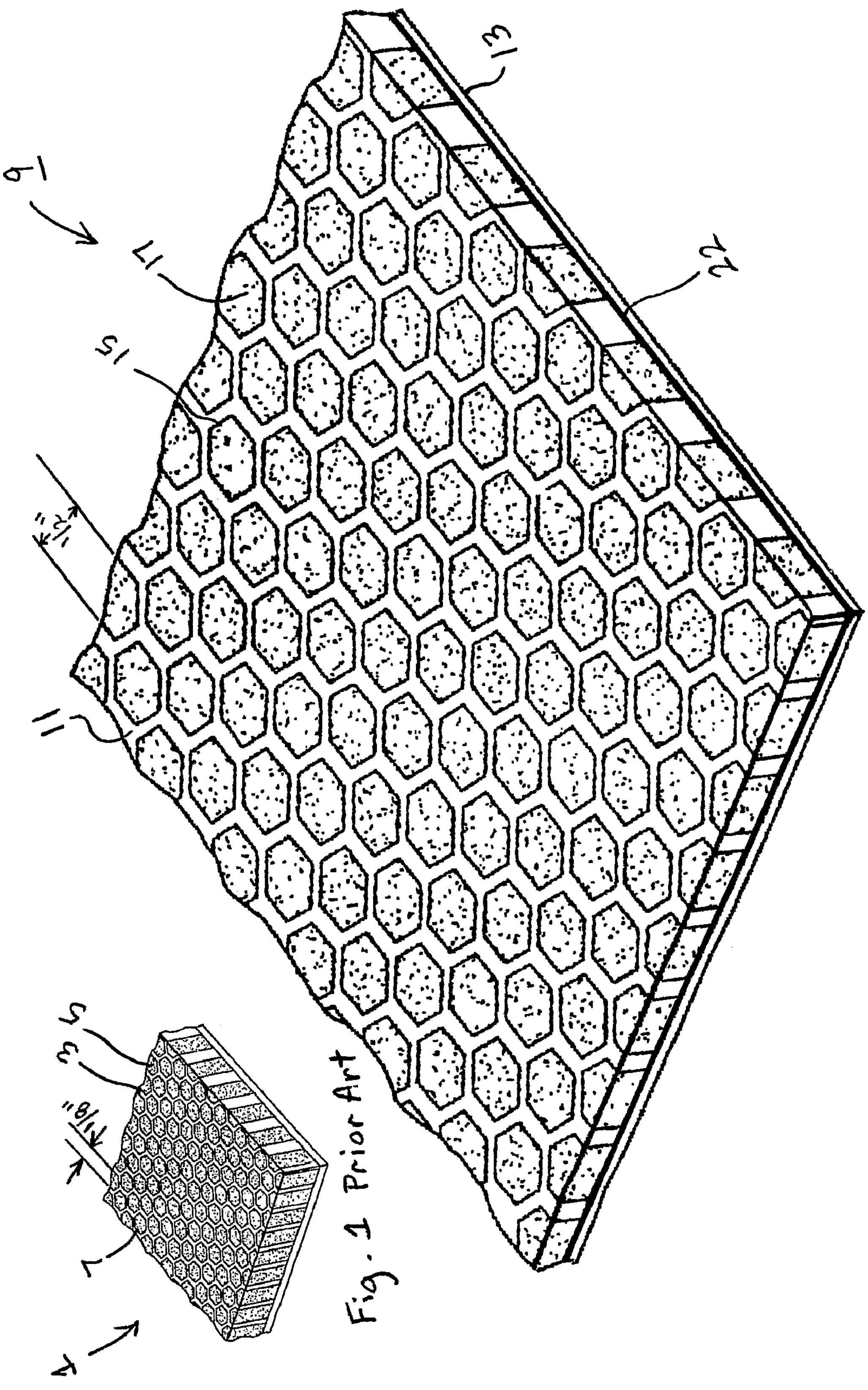
Fig. 1 Prior Art
FIG. 1 is a perspective view of a radar-absorbing honeycomb panel according to prior art.
FIG. 2 is a perspective view of a radar-absorbing honeycomb panel according to the present invention.
Figure 3:
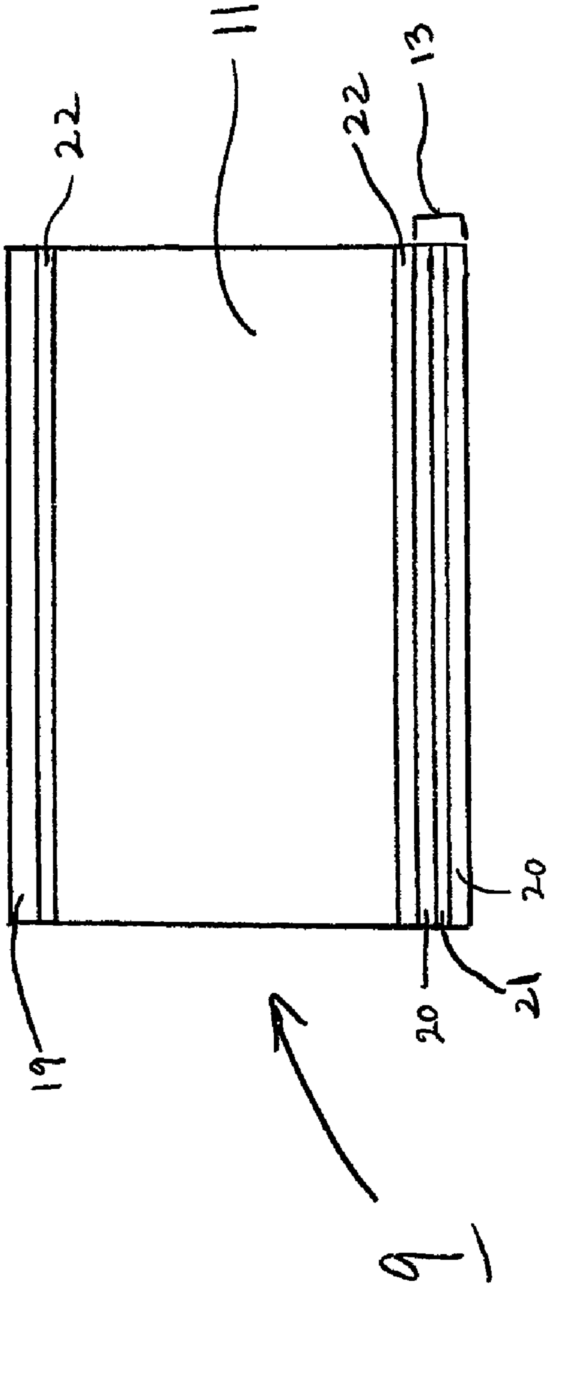
FIG. 3 is a schematic side view of the honeycomb panel of FIG. 2.

Referring now to FIGS. 2 and 3 in the drawings, a partial perspective view and a schematic representation of the preferred embodiment of a radar-absorbing panel 9 according to the present invention are illustrated, respectively. As illustrated in FIG. 2, panel 9 comprises a honeycomb core 11 and a lower skin 13 attached to the bottom of core 11. As seen in FIG. 2, core 11 comprises an array of individual cells 15 which are preferably filled with an aerogel 17. Lower skin 13 is typically constructed of a combination of discrete layers of woven fiberglass held together with epoxy but may alternatively be constructed of any other suitable material or combination of materials. While not illustrated in FIG. 2, a fully assembled panel 9 would include an upper skin 19 (see FIG. 3) attached to the upper side of core 11.

As illustrated, the cells are approximately ½ of an inch in size (compare with the drastically smaller cell size of ⅛ inch illustrated in prior art FIG. 1); however, cells 15 may alternatively be sized as small as approximately ⅜ of an inch or as large as 1 inch and even larger. Cells 15 preferably have a hexagonal cross-sectional area; however, it should be understood that individual cells 15 may have cross-sectional areas of different geometrical shapes. Also, core 11 may be formed from cells 15 having different cross-sectional shapes and sizes ranging from ⅜ of an inch to 1 inch and above, depending upon the effect desired. As referred to throughout this application, "large" cells are cells of a honeycomb core or other core structure containing less than 2.7 cells per linear inch in the core "w" direction (transverse or width direction). In addition, cells 15 may have different cell geometries, including normally expanded, over expanded, under expanded, and flex cell geometries.

Depending upon the desired application, core 11 may be made of any of a number of materials known to those of skill in the art. The material traditionally used to create cores 11 include, but are not limited to, Nomex, fiberglass, Kevlar, quartz, and Korex. To provide radar/microwave absorption, core 11 is typically coated with a carbon slurry, a radar absorptive mixture. The carbon slurry may be applied by dipping core 11 into the mixture or by spraying the carbon slurry mixture onto core 11, or by other suitable means. The thickness and exact composition of the carbon slurry coating may be varied to produce desired radar absorption results. This radar attenuating carbon slurry coating may be applied with an electrical gradient through the thickness of panel 9 or as a uniform or constant loading. It should be appreciated that as more carbon slurry coating is added to core 11, the overall weight of panel 9 increases. Normally, any significant increase in the weight of panel 9 would be undesirable, especially where panel 9 is to be used in conjunction with aircraft.

As more clearly shown in FIG. 3, panel 9 is constructed with a multiplicity of discrete layers. As illustrated, lower skin 13 comprises a ground plane 21 disposed within lower skin 13. Ground plane 21 is illustrated as an electrically conductive ply of material sandwiched between discreet fiberglass layers 20 of the material composition of lower skin 13. Ground plane 21 typically improves radar/microwave signature attenuation by aiding in providing a gradient in conductivity over the thickness of panel 9. The level of conductivity preferably increases from upper skin 19 to lower skin 13. Specifically, ground plane 21 provides a relatively higher level of conductivity than the other individual composite elements of panel 9 located further from lower skin 13. It should be appreciated that in this and other embodiments of the present invention, the entire lower skin 13 may alternatively be comprised of conductive plies of material. For example, the plies of lower skin 13 may be a carbon/epoxy composite material. It should be appreciated that ground plane 21 is optional and may not be incorporated into other embodiments of the present invention (see FIG. 7). Further, it should be appreciated that the benefits achieved by incorporating ground plane 21 may alternatively be achieved in the absence of ground plane 21 but by coating, impregnating, or otherwise treating the existing fabric of discreet fiberglass layers 20. It should be appreciated that in other embodiments of the present invention, materials other than fiberglass may be substituted to form the discreet layers of upper and lower skins 19, 13.

One of the discoveries of the present invention is that panel 9 may optionally comprise a pre-impregnated core (hereinafter referred to as "prepreg") instead of a traditional Nomex, fiberglass, Kevlar, or Korex material for forming core 11. Prepreg materials are generally resin-impregnated cloths, fabrics, mats, tapes, or filaments. Prepreg composite materials are often partially cured to a tack-free state for handling and later fully cured in an oven or autoclave. Prepreg cores offer the functionality of traditional cores but at a lower overall weight since prepreg cores are less sensitive to moisture and do not need to be sealed, thereby enabling the use of reticulated adhesive layers to bond the core to the face sheets. Specifically, prepreg cores are preferred over traditional cores due to their superior specific strength values. The higher specific strength values associated with prepreg cores allow the use of less dense cores, enabling further weight reductions. Prepreg cores can also be tailored to improve a critical strength mode for certain applications. Additionally, prepreg cores can be made from "open-weave" prepreg material which further improves moisture tolerance, reduces weight, and increases insulation effectiveness. Further, additives can be mixed with the resin to obtain specific properties. For example, a core created from prepreg material may optionally comprise a radar/infrared absorbing material such as iron and/or carbon slurry mix integrally dispersed within the resin. In addition to the lower overall weight of the prepreg core, a prepreg core offers a variety of aradar/microwave absorption characteristic options. For example, a prepreg core impregnated with an absorptive resin mix may be coated with a carbon slurry much like a traditional core, thereby offering a combination of absorption means.

Cells 15 are filled with aerogel 17 in one or more forms, including a granular form. Aerogel 17 may be pre-formed having a cross-sectional shape that corresponds to the cross-sectional shape of individual cells 15 of core 11, or aerogel 17 may be in a loose granular form. For those applications in which aerogel 17 is in granular form, aerogel 17 may be held together with a binder, the grains may be free to move within cells 15, or the grains may be tightly packed within cells 15. If desired, cells 15 may be filled with aerogel 17 to further improve the structural integrity of core 11 and overall thermal/infrared signature reduction performance of panel 9.

The type of aerogel 17 used may vary by application. A wide range of aerogels 17 will be known to those of skill in the art. Specific examples of suitable aerogels include silica, alumina, and zirconia aerogels. The portion of each cell 15 filled with aerogel 17 may vary depending on the application. Selected individual cells 15 of the core may be filled with aerogel 17 using any of a number of processes, including sifting, shaking, or raking of granular aerogel 17, as examples.

In certain applications, cells 15 may be filled partially with aerogel 17 and partially with an additional radar-absorbing and/or an additional infrared-absorbing material. Although radar absorption is performed by the material that forms the walls of core 11, this material is typically a poor thermal insulator. Partially filling cells 15 with a radar-absorbing material is advantageous because, by making cells 15 of core 11 large and adding a radar absorbing material to aerogel 17, structural integrity can be maintained, thermal conductivity is reduced, and radar absorption is increased. For example, by adding graphite carbon to aerogel 17, the radar absorbing properties of panel 9 can be considerably improved. Furthermore, it will be appreciated that a wide variety of materials may be added to aerogel 17 to improve selected properties of panel 9, such as electrical conductivity, thermal conductivity, radar absorption, and others.

Further, the infrared signature may be reduced by incorporating a low emissivity feature to lower skin 13. The low emissivity feature serves as a reflective barrier to thermal energy. The low emissivity feature may be achieved in a number of ways, including: disposing an aluminum, gold, silver, or other suitable foil/material on the lower surface of lower skin 13, within lower skin 13, or between lower skin 13 and core 11; depositing low emissivity materials by sputtering, or otherwise applying the low emissivity material to a fabric, mat, or other substrate and disposing the treated material on the lower surface of lower skin 13, within lower skin 13, or between lower skin 13 and core 11; and depositing low emissivity materials by sputtering or otherwise applying the low emissivity material to the skin ply of lower skin 13 adjacent to core 11. While the low emissivity feature has been described as being disposed on or within lower skin 13 or between lower skin 13 and core 11, the low emissivity feature may alternatively be located at other places within panel 9 resulting in different thermal reflection characteristics. Of course, these techniques may optionally be incorporated into other embodiments of the present invention. Incorporating the low emissivity feature may also provide electrical conductivity similar to ground plane 21 and may therefore be placed within panel 9 in a manner so as to tune panel 9 for specific applications. In fact, the low emissivity feature can replace ground plane 21 entirely and thereby save additional weight.

By selectively combining different materials in the individual cells 15 of radar-absorbing core 11, the overall properties of panel 9 can be selectively tuned for specific applications. For example, a lower range of microwave radio frequencies are typically used to detect fixed wing aircraft and high altitude aircraft; therefore, panel 9 can be tuned to specifically reduce the radar/microwave signature of those aircraft by tuning panel 9 to better absorb that lower range of frequencies. Also, a selected gradient of conductivity may be obtained by implementing various levels of opacification coatings to aerogels 17 and then selectively layering or packing the treated and non-treated aerogels within cells 15 to effectuate a desired gradient of conductivity. Opacification may be provided by multiple methods including coating aerogel 17 with carbon or rutile. It is well known in the art of reducing radar/microwave signatures that the gradient of conductivity for panel 9 preferably increases in conductivity from the outermost portion of panel 9 to the portion of panel 9 closest to the skin of the vehicle to which it is attached. Of course, more conductive coatings could be applied to aerogel 17 or additional electrically conductive or magnetic filler could be dispersed within cells 15 to create the desired electrical gradient. It should be appreciated that selectively layering opacified aerogels 17, non-opacified treated aerogels 17, and other fillers may alternatively be implemented in any of the embodiments of the present invention.

After the selected cells 15 are filled to the desired level with the chosen combination of aerogel 17 and/or other materials, an upper skin 19 (see FIG. 3) is added to the top of core 11 to complete panel 9. As illustrated in FIG. 3, core 11 is sandwiched by two layers of film adhesive 22. Film adhesive 22 acts to secure core 11 to lower and upper skins 13, 19. The skin material can vary from one application to another. Examples of suitable skin materials include fiberglass, carbon fiber, Kevlar, and quartz. In certain applications using certain materials, a room temperature cure may be employed. Other curing methods may require elevated temperature and/or pressure in order to accomplish a proper cure. It should be appreciated that panel 9 may be cured in a single curing operation or in a series of separate curing operations.

It has been determined that evacuation of cells 15 provides significant thermal advantages over the combination of aerogel 17 and air. Alternatively, cells 15 can be filled with a low-density gas in order to improve the thermal performance without the additional mechanical stresses imposed by a pressure differential across lower skin 13 and upper skin 19.

Figure 4:
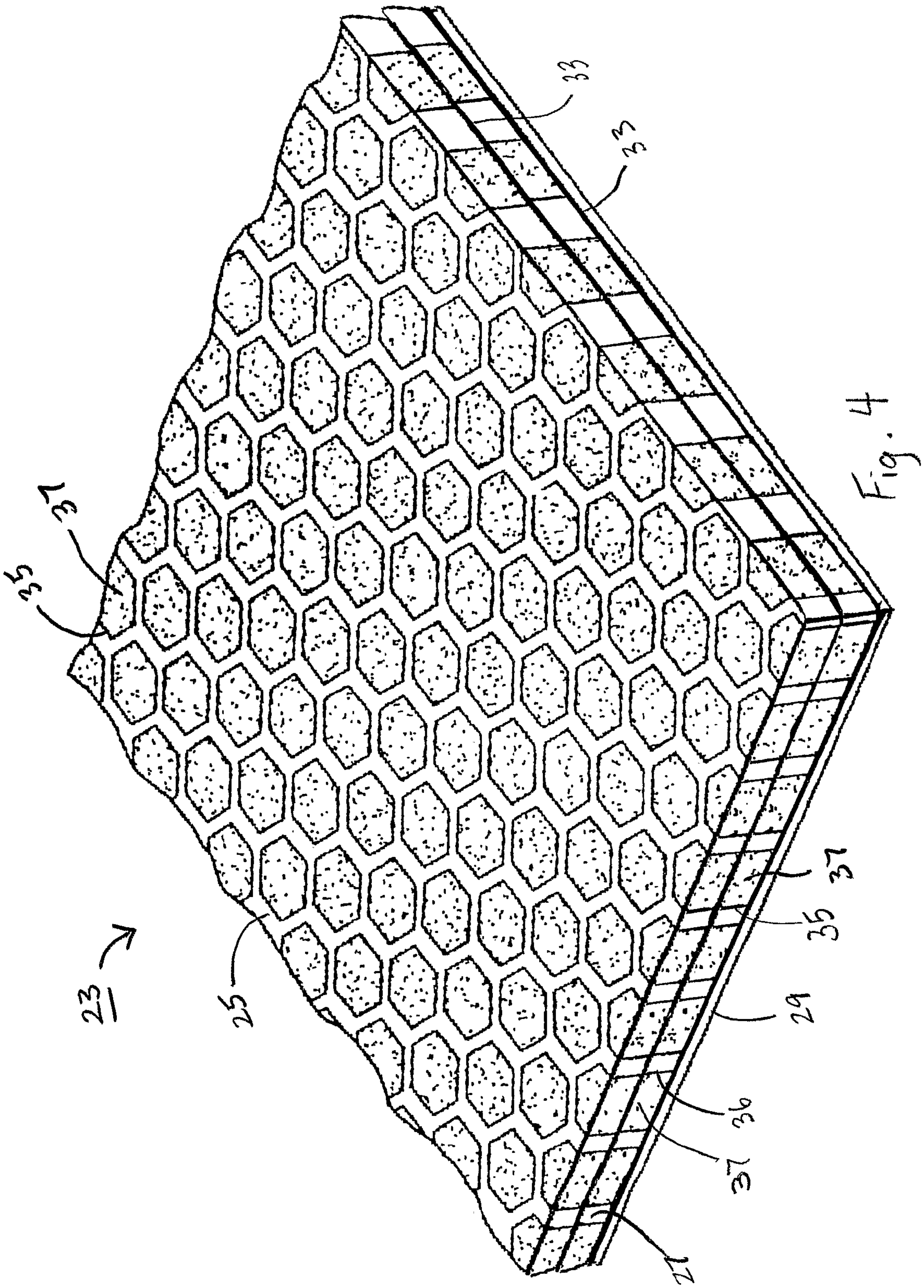
FIG. 4 is a perspective view of an alternate embodiment of the radar-absorbing honeycomb panel of FIG. 2.
Figure 5:
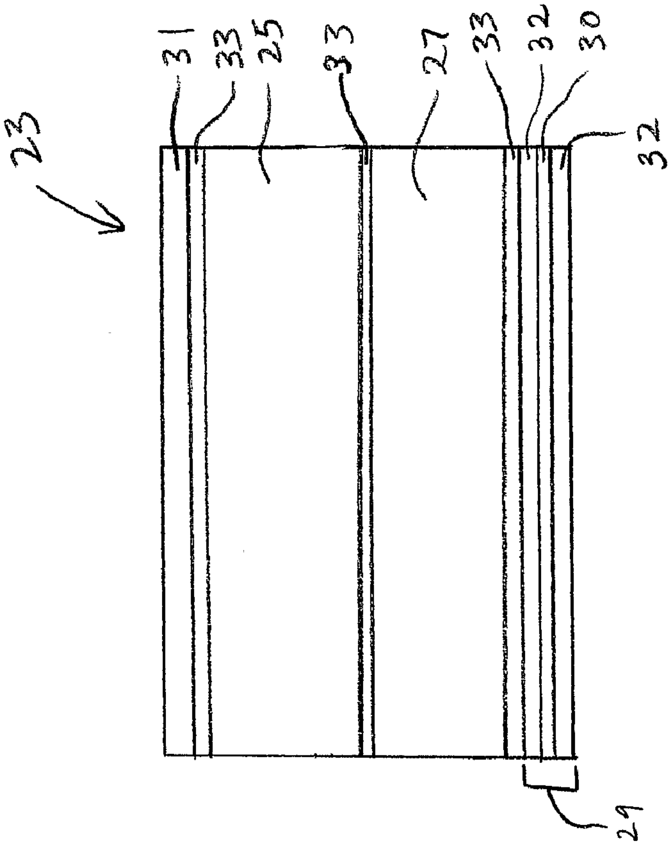
FIG. 5 is a schematic side view of the honeycomb panel of FIG. 4.

Referring now to FIGS. 4 and 5 in the drawings, a partial perspective view and a schematic representation of a radar-absorbing panel 23 having multiple cores according to the present invention are illustrated, respectively. As illustrated, panel 23 comprises an upper core 25 (see FIG. 5), a lower core 27, a bottom skin 29, and a top skin 31 (see FIG. 5). More specifically, panel 23 preferably further comprises a film adhesive 33 disposed between top skin 31 and upper core 25, film adhesive 33 disposed between upper core 25 and lower core 27, film adhesive 33 disposed between lower core 27 and bottom skin 29, and a ground plane 30 disposed within bottom skin 29 between discreet layers of fiberglass 32. It should be appreciated that an absorptive/resistive mat or ply (discussed infra) may be located adjacent to film adhesive 33 in one or more of its locations as shown in FIG. 5. Upper core 25 comprises a multiplicity of upper cells 35 and lower core 27 comprises a multiplicity of lower cells 36. Upper cells 35 and lower cells 36 are optionally filled with aerogel 37. As discussed above, aerogel 37 may optionally be treated with various coatings to improve or otherwise alter the radar/microwave attenuating properties of aerogel 37. More specifically, as discussed above, aerogels 37 with different levels of opacification coatings may be selectively layered within upper cells 35 and lower cells 36 to produce a desired gradient of conductivity throughout the thickness of panel 23.

As shown in FIG. 4, upper core 25 and lower core 27 are preferably located such that upper cells 35 of upper core 25 and lower cells 36 of lower core 27 are significantly vertically aligned. Vertically aligning upper cells 35 and lower cells 36 of the stacked cores 25, 27 typically produces improved infrared/heat signature reduction as well as structural integrity over merely allowing upper cells 35 and lower cells 36 to remain unaligned. Film adhesive 33 (of the supported type) is typically a continuous sheet comprising a fiber or mesh/scrim substrate of fiberglass coated or soaked through with uncured adhesive; however, film adhesive 33 may alternatively be of the unsupported type comprising only an adhesive layer. Further, it should be appreciated that film adhesive 33 may be perforated, reticulated, or otherwise have portions removed such that when properly aligned with upper and lower cores 25, 27, the reticulated film adhesive 33 covers only the area needed to contact and bond with upper and lower cores 25, 27. By reticulating film adhesive 33, the overall weight of panel 23 may be significantly reduced. Of course, reticulated film adhesives may be used in any of the embodiments of the present invention.

Figure 6:
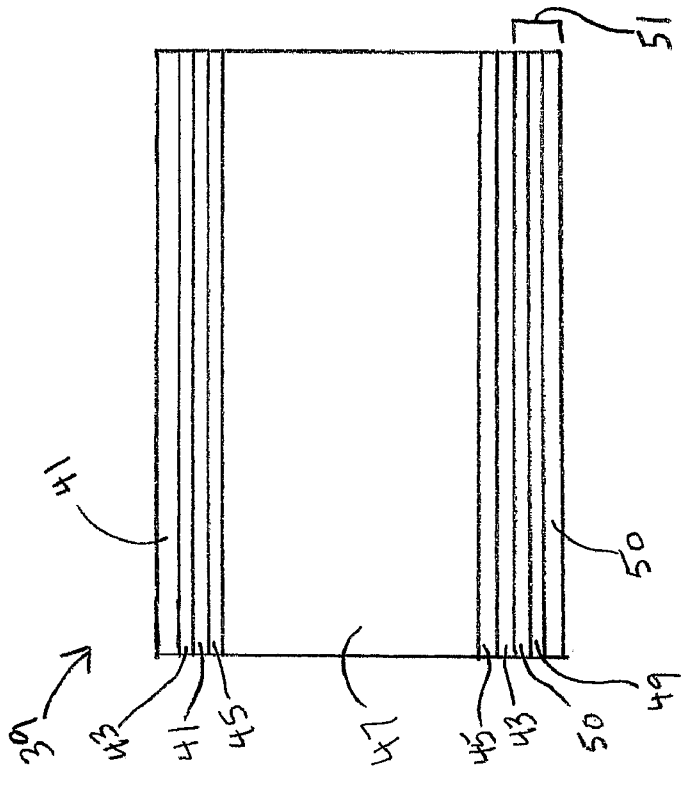
FIG. 6 is a schematic side view of another alternate embodiment of the radar-absorbing honeycomb panel of FIG. 2.

Now referring to FIG. 6 in the drawings, a schematic representation of a radar-absorbing panel 39 according to the present invention is illustrated. Panel 39 is shown as comprising an upper skin 41, an absorptive or resistive mat or ply 43, an absorptive film adhesive 45, an absorptive prepreg core 47, a conductive ground plane 49, and a lower skin 51. Upper skin 41, prepreg core 47, ground plane 49, layers of fiberglass 50, and lower skin 51 are very similar in construction and function as the similar elements of panel 23. Absorptive/resistive mats or plies 43 are illustrated as being located between discreet plies of fiberglass within upper skin 41 and between lower skin 51 and the layer of film adhesive 45 attached to the bottom side of core 47; however, plies 43 and/or similar sheets or fabrics may alternatively be located at different discrete levels within panel 39 or panel 23 to achieve a desired gradient of conductivity. Notably, in panel 39, the typical fiberglass mesh substrate of film adhesive is preferably replaced by a radar/microwave absorptive material. The gradient of conductivity of panel 39 is further selectively altered by incorporating radar/microwave absorption means into film adhesive 45. Of course, absorptive film adhesive 45 may alternatively be incorporated into other embodiments of the present invention.

Figure 7:
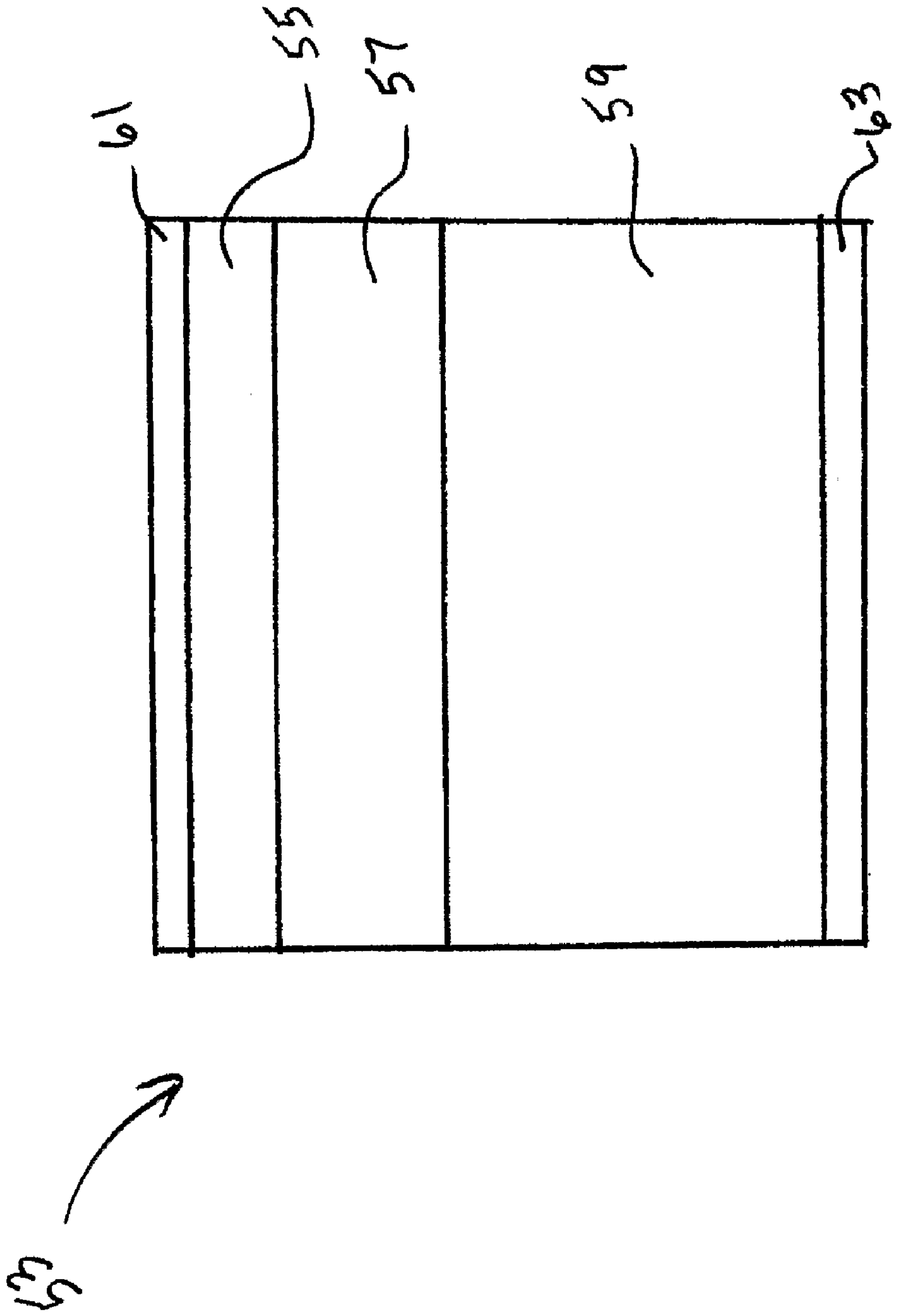
FIG. 7 is a simplified schematic side view of another alternate embodiment of the radar-absorbing honeycomb panel of FIG. 2.

Now referring to FIG. 7 in the drawings, a simplified schematic representation of a radar-absorbing panel 53 according to the present invention is illustrated. Panel 53 comprises a first core 55, a second core 57, a third core 59, an upper skin 61 and a lower skin 63. Cores 55, 57, and 59 are constructed similar to cores of other embodiments described above. Skins 61, 63 are constructed similar to skin of other embodiments described above. It is important to note that as illustrated, panel 53 comprises more than two cores. It should be appreciated that other embodiments may have more than three cores. Cores 55, 57, and 59 are successively thicker; however, alternative embodiments of panel 53 may situate multiple cores such that the various sizes of cores are not stacked progressively larger or smaller. For example, the various sizes of cores may be stacked in any other suitable order. Further, a panel may consist of any number of cores, each core being any suitable thickness, and the cores being stacked in any suitable order or manner.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A panel for a vehicle comprising:
- a first skin;
- a second skin;
- a honeycomb structure disposed between the first skin and the second skin and formed from an array of large cells, each cell having a selected volume disposed between the first skin and the second skin; and
- wherein the honeycomb structure is adapted for attenuating an electromagnetic signature of the vehicle.

2. The panel according to claim 1 further comprising:
- a thermally insulative material disposed within the cells of the honeycomb structure and wherein the thermally insulative material reduces an electromagnetic signature of the vehicle.

3. The panel according to claim 2, wherein the thermally insulative material is an aerogel.

4. The panel according to claim 3, wherein at least a portion of the aerogel is treated with an opacification coating.

5. The panel according to claim 4, wherein the aerogel is arranged within the cells so as to selectively create an electrical gradient within the cells.

6. The panel according to claim 1, wherein the cells have a hexagon cross-sectional shape.

7. The panel according to claim 1 wherein the honeycomb structure is formed from a prepreg material.

8. The panel according to claim 7, wherein the prepreg material is pre-impregnated with a radar absorptive material.

9. The panel according to claim 1, wherein the cells are at least ⅜ of an inch in size.

10. The panel according to claim 1, further comprising:
a second honeycomb structure disposed between the first skin and the second skin.

11. The panel according to claim 1, further comprising a ground plane disposed within the first skin.

12. A panel for a vehicle comprising:
a first skin;
a second skin;
a first honeycomb structure formed from an array of cells, each cell having a selected volume disposed between the first skin and the second skin;
a second honeycomb structure formed from an array of cells, each cell having a selected volume disposed between the first skin and the second skin;
a thermally insulative material disposed within the cells of the first honeycomb structure and the cells of the second honeycomb structure; and
wherein each of the first honeycomb structure, the second honeycomb structure, and the thermally insulative material are adapted to attenuate an electromagnetic signature of the vehicle.

13. The panel according to claim 12, wherein the first honeycomb structure and second honeycomb structure have substantially the same thickness.

14. The panel according to claim 12, wherein the cells of the first honeycomb structure and the cells of the second honeycomb structure are substantially aligned.

15. The panel according to claim 12, wherein the cells of the first honeycomb structure and the cells of the second honeycomb structure are selectively filled with an opacified aerogel to create a gradient of conductivity.

16. The panel according to claim 12, wherein the first skin is constructed of a carbon and epoxy composite material.

17. The panel according to claim 12, wherein first honeycomb structure and second honeycomb structure are constructed of a prepreg material.

18. The panel according to claim 17, wherein the prepreg material is impregnated with a radar absorptive material.

19. A method of simultaneously attenuating the radar signature and the infrared signature of a vehicle comprising the steps of:
providing a first skin;
providing a second skin;
forming a honeycomb structure from a prepreg material, the honeycomb structure having an array of cells;
disposing the honeycomb structure between the first skin and the second skin; and
disposing a thermally insulative material within the cells of the honeycomb structure.

20. The method according to claim 19, wherein the cells are large.

21. The method according to claim 19, further comprising the steps of:
forming a second honeycomb structure from a prepreg material, the second honeycomb structure having an array of cells; and
disposing the second honeycomb structure between the first skin and the second skin.

* * * * *